(12) United States Patent
Yanagimoto et al.

(10) Patent No.: US 6,991,522 B2
(45) Date of Patent: Jan. 31, 2006

(54) METHOD OF MANUFACTURING ASYMMETRIC GEAR, ASYMMETRIC GEAR, NON-CIRCULAR AND ASYMMETRIC GEAR, GEAR MECHANISM, AND BARREL FINISHING MACHINE

(75) Inventors: Kazushi Yanagimoto, 1011-2, Kinokawa-cho, Kusatsu-shi, Shiga 525-0051 (JP); Takehiro Otsubo, 11-36-2, Suizenji 3-chome, Kumamoto-shi, Kumamoto 862-0950 (JP); Katsuyuki Nakayama, Shiga (JP); Kazuaki Sakai, Shiga (JP)

(73) Assignees: Kazushi Yanagimoto, Kusatsu (JP); Takehiro Otsubo, Kumamoto (JP)

( * ) Notice: Subject to any disclaimer, the term of this patent is extended or adjusted under 35 U.S.C. 154(b) by 1 day.

(21) Appl. No.: 10/433,150

(22) PCT Filed: Nov. 29, 2001

(86) PCT No.: PCT/JP01/10455

§ 371 (c)(1),
(2), (4) Date: May 30, 2003

(87) PCT Pub. No.: WO02/44590

PCT Pub. Date: Jun. 6, 2002

(65) Prior Publication Data

US 2004/0064947 A1 Apr. 8, 2004

(30) Foreign Application Priority Data

Nov. 30, 2000 (JP) .......................... 2000-364359

(51) Int. Cl.
*B24B 1/00* (2006.01)

(52) U.S. Cl. .......................................... 451/47; 451/48
(58) Field of Classification Search .................. 451/47, 451/48, 147, 148; 409/12, 26, 48, 51; 29/893.3; 74/457

See application file for complete search history.

(56) References Cited

U.S. PATENT DOCUMENTS

| 263,791 | A | * | 9/1882 | Lekere | .......................... 74/437 |
| 1,922,757 | A | * | 8/1933 | Candee | .......................... 409/48 |

FOREIGN PATENT DOCUMENTS

| JP | 51-67877 | 6/1976 |
| JP | 55-90752 | 7/1980 |
| JP | 60-166775 | 8/1985 |
| JP | 1-168898 | 12/1987 |
| JP | 2-225841 | 2/1989 |
| JP | 3-228565 | 10/1991 |
| JP | 11-322373 | 5/1998 |
| JP | 11-44294 | 2/1999 |

OTHER PUBLICATIONS

PCT/JP01/10455, Nov. 5, 2003, PCT: Notification of Transmittal of Copies of Translation of the International Preliminary Examination Report.

* cited by examiner

*Primary Examiner*—Dung Van Nguyen
(74) *Attorney, Agent, or Firm*—Rouzbeh Tabaddor

(57) ABSTRACT

An object of the present invention is to provide a practical gear and gear train which can be used in an actual gear drive system. Another object of the present invention is to provide a non-circular and asymmetrical gear which is practically used in view of durability, a gear train using that gear, and a barrel finishing machine using that gear. Non-circular and asymmetrical gear 10 has a plurality of tooth profiles 20, each of which comprises a substantially semicircular top curve line 16 and a substantially semicircular bottom curved line 18. A center point 22 of the top curved line 16 is on a pitch line 24, and a center point 26 of the bottom curved line 18 lies inside the pitch line 24.

5 Claims, 20 Drawing Sheets

Fig. 4
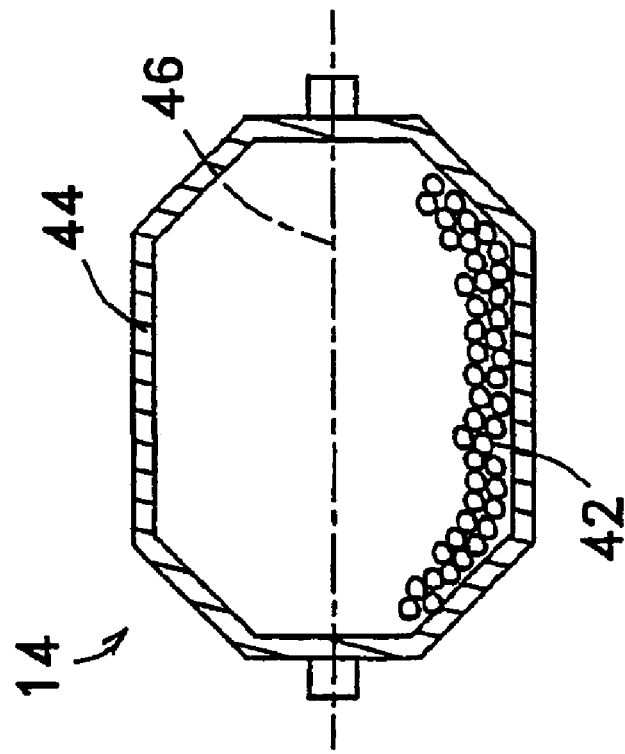
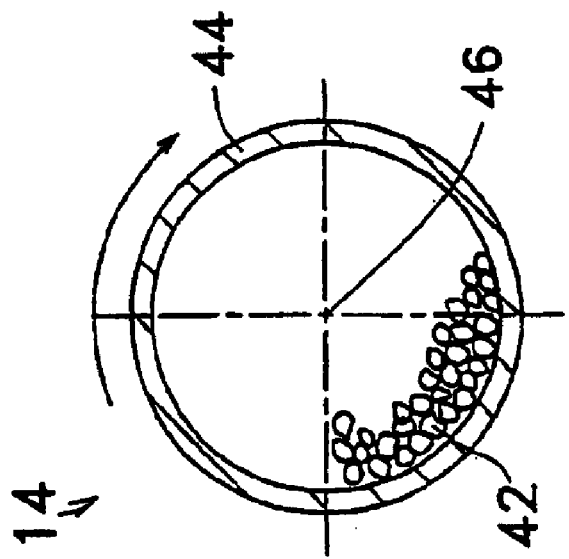

Fig. 7
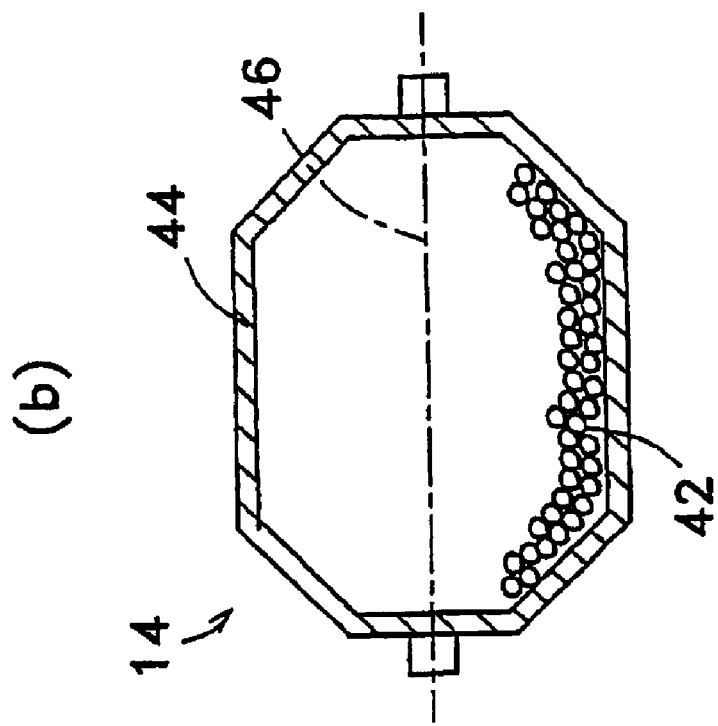
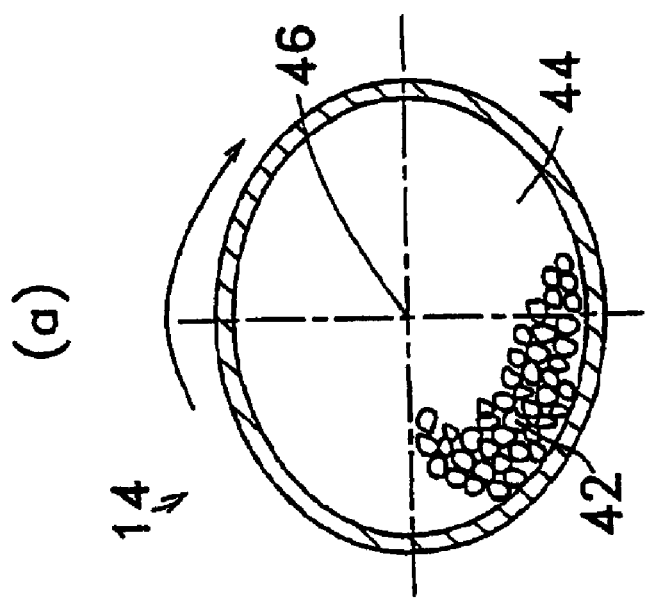

METHOD OF MANUFACTURING ASYMMETRIC GEAR, ASYMMETRIC GEAR, NON-CIRCULAR AND ASYMMETRIC GEAR, GEAR MECHANISM, AND BARREL FINISHING MACHINE

FIELD OF THE INVENTION

The present invention relates to gears such as parallel gears, intersecting axis gears, crossed gears, a gear train using the same, and a barrel finishing machine using the same.

BACKGROUND OF THE INVENTION

A gear or gear train has been used as a means for transmitting rotary motion so far. Such gear or gear train transmits rotary motion not at variable angular velocity ratios depending on the number of gear teeth but at an fixed angular velocity ratio. To solve this problem, Japanese Unexamined Patent Publication No. (Patent Kokai No.) 10-184852 (1998) discloses a transmission device that can transmit rotary motion at variable angular velocity ratios. However, a gear disclosed in that publication is an odd gear, so that it is difficult to produce it by machining, and the production of gear requires a great deal of production cost and time. To solve this problem, Japanese Unexamined Patent Publication No. (Patent Kokai No.) 2000-81112 discloses a gear and gear train having a plurality of tooth profiles, each of which comprises a semicircular top curved line and a semicircular bottom curved line and in which a distance between a pitch line and a rotation center is not constant.

However, there has emerged a need for developing a more practical gear which has high durability to withstand a load, which does not make noise, which can be produced without problems, and in which no unnecessary force is applied to a rotation shaft.

As the result of our intensive studies on odd gears, we have eventually found the present invention.

DISCLOSURE OF THE INVENTION

An object of the present invention is to provide a practical gear and gear train which can be used in an actual gear drive system.

A method of producing asymmetrical gears according to the present invention is characterized by comprising the steps of: recognizing fluctuations in loads on rotation shafts of the gears; determining pitch curves in accordance with the fluctuations; correcting the pitch curves so that the gears having the pitch curves mesh with each other; determining tooth profiles in accordance with the corrected pitch curves; and machining gear materials to the determined tooth profiles.

In this specification, "asymmetrical gear" is a gear which is not symmetrical with respect to all the lines passing through the rotation center thereof.

The method of producing asymmetrical gears according to the present invention is characterized in that the aforementioned step of determining pitch curves comprises the substeps of: determining fluctuations in rotational speeds in accordance with the fluctuations in loads; and determining fluctuations in radii of the pitch curves in accordance with the fluctuations in rotational speeds.

The method of producing asymmetrical gears according to the present invention is characterized in that the aforementioned substep of determining fluctuations in rotational speeds is determining fluctuations in rotational speeds in such a manner that the rotational speeds increase with decrease of the loads and that the rotational speeds decrease with increase of the loads.

The method of producing asymmetrical gears according to the present invention is characterized in that the aforementioned substep of determining fluctuations in rotational speeds is determining fluctuations in rotational speeds in such a manner that rates at which the rotational speeds decrease with increase of the loads are different from rates at which the rotational speeds increase with decrease with the loads.

The method of producing asymmetrical gears according to the present invention is characterized in that the aforementioned step of machining gear materials comprises the substeps of: preparing NC (numerically controlled) data of the determined tooth profiles; and machining the gear materials in accordance with the NC data.

In this specification, "machining" means machining a secured gear material by a movable machine tool, which is conceptually different from generating.

Asymmetrical gears of the present invention are characterized by being produced by: recognizing fluctuations in loads on rotation shafts of the gears; determining pitch curves in accordance with the recognized fluctuations; correcting the pitch curves so that the gears having the pitch curves mesh with each other; determining tooth profiles in accordance the pitch curves; and machining gear materials to the determined tooth profiles.

The asymmetrical gears of the present invention are characterized in that an increase rate of a rotational speed of a driven gear is different from a decrease rate thereof when at least two asymmetrical gears rotate in a mesh.

Non-circular and asymmetrical gears of the present invention are characterized by comprising a plurality of tooth profiles, each of which has a substantially semicircular top curved line and a substantially semicircular bottom curved line, wherein a center point of the top curved line is on a pitch line and a center point of the bottom curved line lies inside the pitch line.

In this specification, the "tooth profile" comprises a top curved line and a bottom curved line, and a plurality of tooth profiles form an outer perimeter curve of a gear. The top curved line is a part of the tooth profile which is outside the pitch line, and the bottom curved line is the rest part of the tooth profile which is inside the pitch line. The non-circular and asymmetrical gears may be cams having a wavy outline.

The non-circular and asymmetrical gears are characterized in that the top curved line and the bottom curved line are connected through a substantially straight line.

The non-circular and asymmetrical gears are characterized in that a pitch radius between the pitch line and the rotation center is not constant but non-circular, and is asymmetrical with respect to all the lines passing through the rotation center.

Further, non-circular and asymmetrical gears are characterized by comprising: a plurality of tooth profiles, each of which has a substantially semicircular top curved line and a substantially semicircular bottom curved line, wherein a pitch radius between a pitch line and a rotation center and at least a radius of the top curved line are not constant.

The non-circular and asymmetrical gears are characterized in that a radius of a top curved line of a tooth profile neighboring a point on the pitch line which makes the pitch radius maximum is longer than that of the top curved line of any other tooth profile.

Next, a gear train of the present invention is characterized by comprising: a first gear having tooth profiles, each of which comprises a substantially semicircular top curved line and a substantially semicircular bottom curved line; and a second gear which is in mesh with the first gear, wherein a center point of the top curved line of the first gear is on a pitch line and a center point of the bottom curved line of the first gear lies inside the pitch line.

The gear train of the present invention is characterized by comprising: a first gear having tooth profiles, each of which comprises a substantially semicircular top curved line and a substantially semicircular bottom curved line; and a second gear which is in mesh with the first gear, wherein a pitch radius between a pitch line and a rotation center and at least a radius of the top curved line are not constant.

In such gear train of the present invention in which the gears of the present invention are used, a driven gear rotates at variable speeds. Therefore, the gear train of the present invention can be used in a washing machine, mixing machine (mixer, barrel finishing machine, or the like), windshield wiper, or the like. Alternatively, in the gear train of the present invention, a driven gear rotates at variable speeds by the rotation of a driving gear. When a crank or lever is added to one of the gears, the crank or lever is reciprocated or oscillated. Therefore, the gear train of the present invention can be used for a piston crank mechanism of an engine, compressor, or the like, or in an engine, compressor, or the like.

Further, the gear train of the present invention is characterized by comprising: a first gear in which a pitch radius between a pitch line and rotation center is not constant; a second gear which is in mesh with the first gear; and a third gear which is in mesh with the second gear, wherein the length of the pitch line of the second gear is different from that of the pitch line of the third gear. In this specification, the term "pitch line" means a section line of a pitch surface of a gear which is in rolling contact with another gear, and includes a straight line or a curve such as circle.

A barrel finishing machine in which a drum containing workpieces and abrasives is rotated at variable speeds by a gear train according to the present invention is characterized in that the gear train is composed of non-circular gears having a plurality of substantially semicircular tooth profiles each of which comprises a substantially semicircular top curved line and a substantially semicircular bottom curved line, wherein a center point of the top curved line is on a pitch line; a center point of the bottom curved line lies on or inside the pitch line; pitch curves of the non-circular gears vary in accordance with a speed ratio produced in one rotation of the barrel; a contact point of the pitch curves is on a line connecting the centers of the both gears; the tooth profiles of the both gears are composed of curves which are engaged with each other; and a peripheral speed and trajectory length of the workpieces and abrasives in the drum are variable.

In this specification, the "curves which are engaged with each other" means an involute, cycloid, or trochoid curve, or a similar curve thereof. The pitch line of the asymmetrical gear can be non-circular and asymmetrical to produce soft driving and running conditions of the variable-speed barrel rotation.

The barrel finishing machine in which a drum containing workpieces and abrasives is rotated by a gear train according to the present invention is characterized in that the gear train is composed of gears having a plurality of substantially semicircular tooth profiles, each of which comprises a substantially semicircular top curved line and a substantially semicircular bottom curved line and in which a pitch radius between a pitch line and a rotation center and at least a radius of the top curved line are not constant.

The barrel finishing machine which does not have the aforementioned gear train is characterized in that the drum is substantially circular or oval in cross section perpendicular to a rotation shaft.

Further, a barrel finishing machine in which a drum containing workpieces is rotated by a gear train according to the present invention is characterized in that the drum is substantially circular or oval in cross section perpendicular to a rotation shaft.

The barrel finishing machine according to the present invention is characterized by comprising a partition plate or torsion spring in the drum.

The barrel finishing machine according to the present invention is characterized in that the drum is tapered toward one end or both ends of the drum in the direction of the rotation shaft or toward the center of the drum in the direction of the rotation shaft.

BRIEF DESCRIPTION OF DRAWINGS

FIG. 4 show a barrel finishing machine using the gears shown in FIG. 1. FIG. 4(a) is a front sectional view and FIG. 4(b) is a side sectional view.

FIG. 7 show other embodiments of the barrel finishing machine of the present invention. FIG. 7(a) is a front sectional view and FIG. 7(b) is a side sectional view.

DESCRIPTION OF THE PREFERRED EMBODIMENTS

Next, embodiments of a non-circular and asymmetrical gear, a gear train, and a barrel finishing machine according to the present invention will be described in detail with reference to the accompanying drawings.

Figure 1:
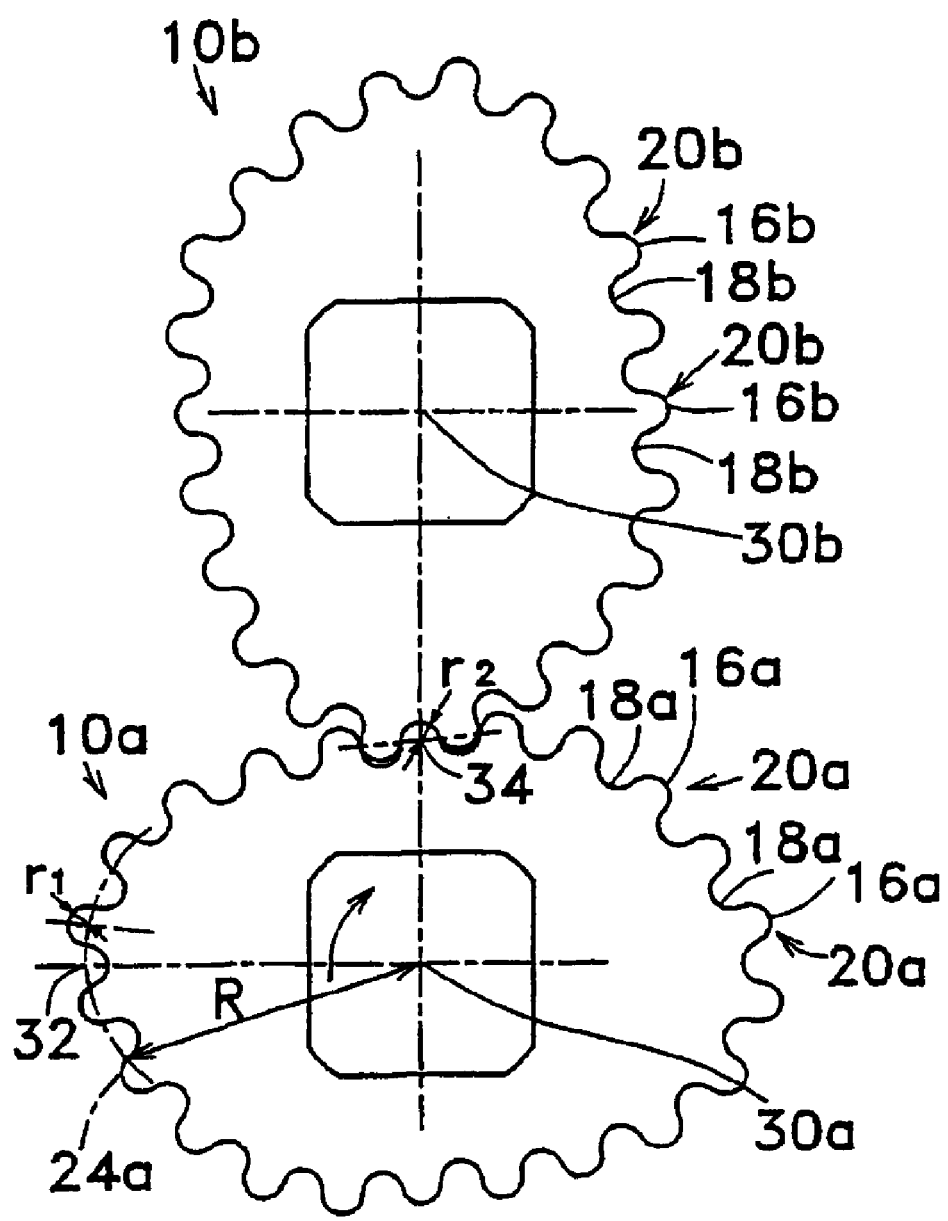
FIG. 1 is a front view of non-circular and asymmetrical gears of the present invention.
Figure 2:
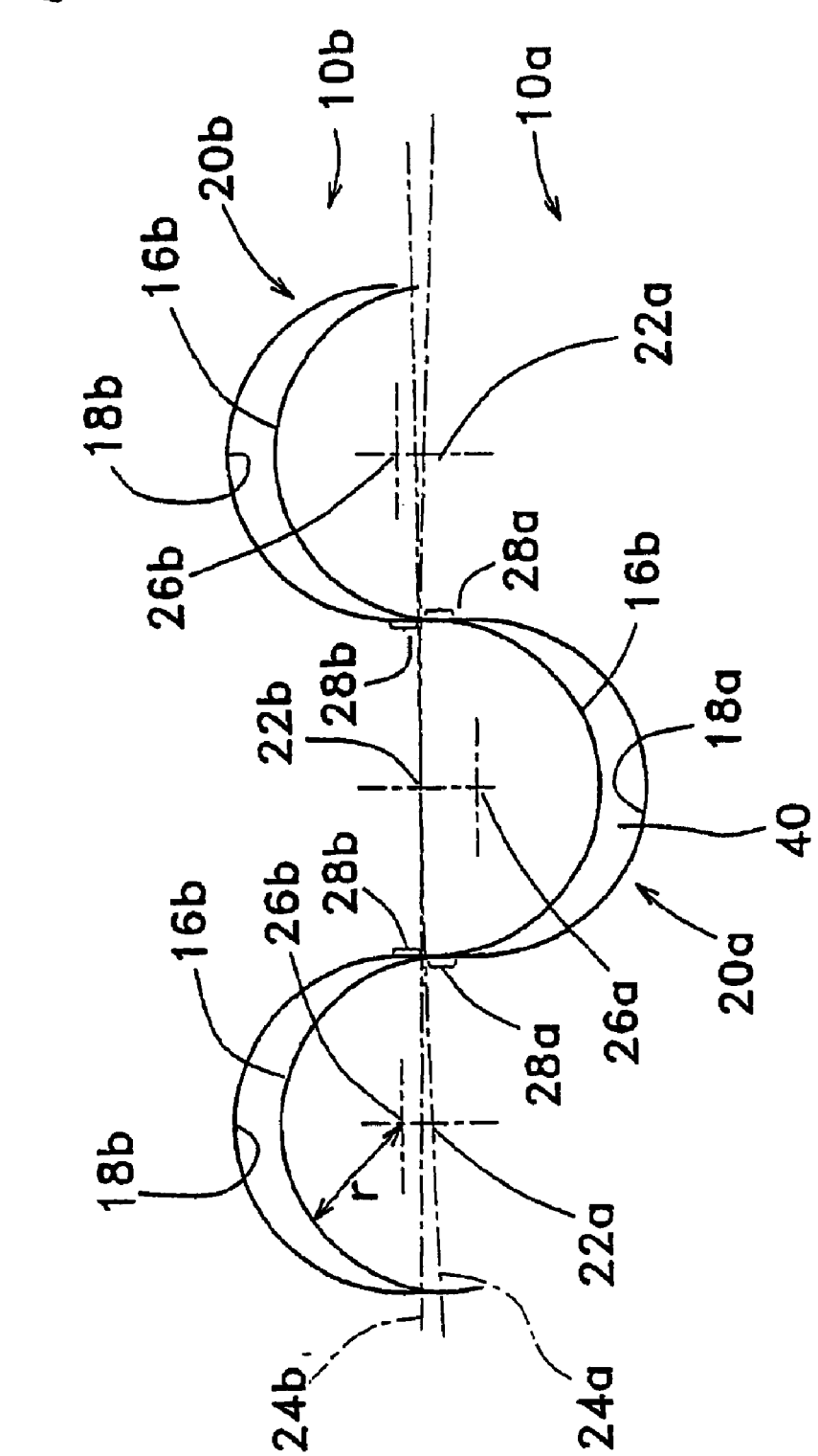
FIG. 2 is an enlarged front view of the non-circular and asymmetrical gears shown in FIG. 1.
Figure 3:
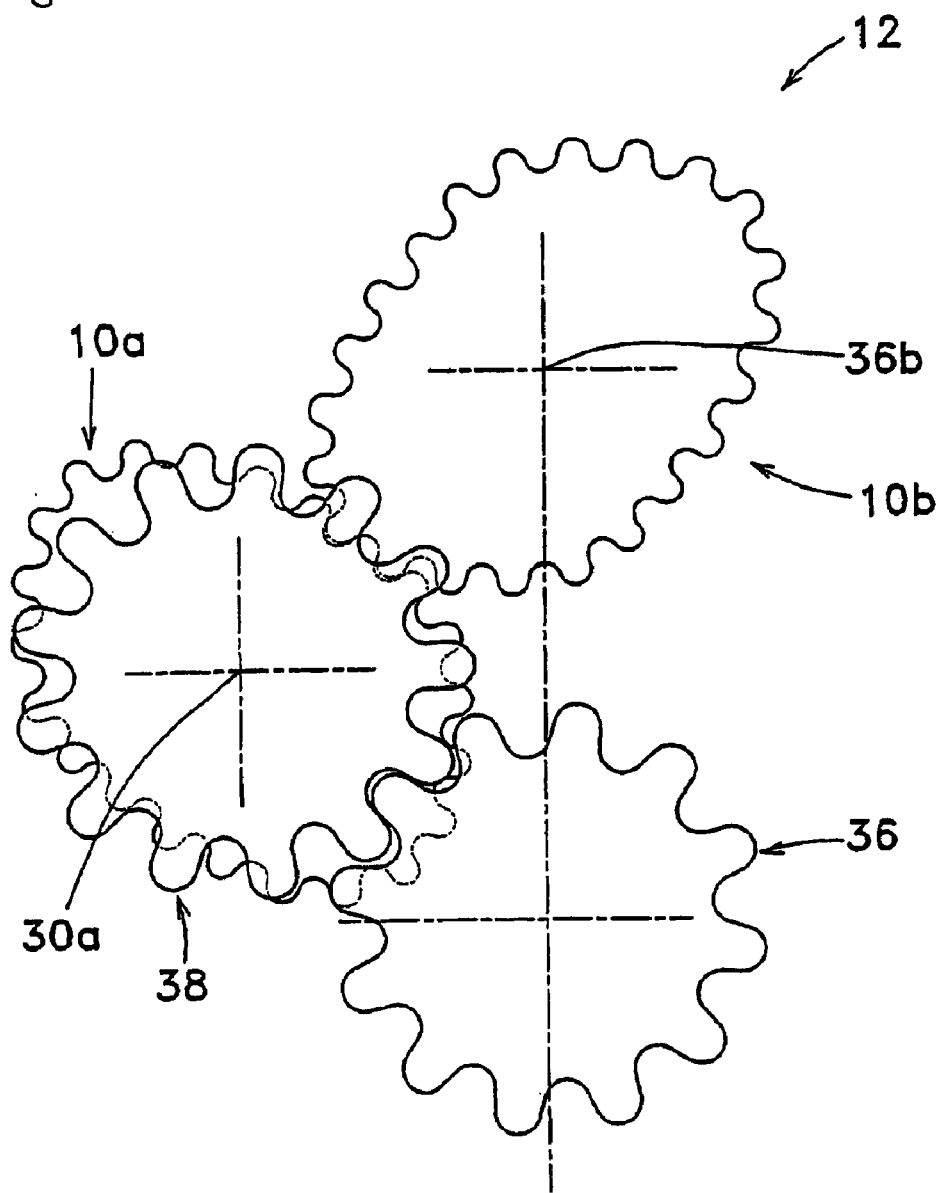
FIG. 3 is a front view of a gear train using the non-circular and asymmetrical gears shown in FIG. 1.

In FIGS. 1 and 2, a numeral 10 indicate non-circular and asymmetrical gears of the present invention. In FIG. 3, a numeral 12 is a gear train of the present invention. In FIG. 4, a numeral 14 indicates a barrel finishing machine using the non-circular and asymmetrical gears 10 and the gear train 12. In this specification and accompanying drawings, the gears 10 comprise a gear 10a and a gear 10b. Top curved lines 16 comprise top curved lines 16a and 16b, bottom curved lines 18 comprise bottom curved lines 18a and 18b, and tooth profiles 20 comprise tooth profiles 20a and 20b.

The non-circular and asymmetrical gear 10 has a plurality of tooth profiles 20, each of which comprises a substantially semicircular top curved line 16 and a substantially semicircular bottom curved line 18. As shown in FIG. 2, a center point 22 of the top curved line 16 is on a pitch line 24, and a center point 26 of bottom curved line 18 lies inside the pitch line 24. In other words, there are clearances 40 between the bottom curved line 18a of the gear 10a and the top curved lines 16b of the gear 10b and between the bottom curved lines 16b of the gear 10b and the top curved lines 16a of the gear 10a in the tooth profiles 20a and 20b having contact points of the two gears. The top curved lines 16 and the bottom curved lines is are connected through a straight line 28. The gear 10 is an odd gear whose pitch line 24 is elliptical, and a pitch radius R between the pitch line 24 and a rotation center 30 is not constant.

In such non-circular and asymmetrical gear 10, it is preferable that at least the radii r of the top curved lines 16 are not constant so as to bear load when the gears 10 are rotated. For example, assuming that a radius r1 is a radius of a top curved line 16 of a tooth profile 20 neighboring a point 32 on the pitch line which makes a pitch radius R maximum and a radius r2 is a radius of a top curved line 16 of a tooth profile 20 neighboring a point 32 on the pitch line which makes a pitch radius R minimum, it is preferable that the radius r1 is longer than the radius r2. This is because a speed increasing ratio of rotation becomes the highest and the biggest load is applied on the gear 10a in the direction of rotation of the rotation shaft 30a when the gear 10a comes in contact with the gear 10b in the neighborhood of the point 32. As the gear 10a rotates from the point 34 to the point 32, the radius r of the top curved line 16 may become longer. As the point of contact is shifted from the point 34 and the point 32, the speed increasing ratio increases. Therefore, it is considered that the gear 10b accelerates and that the load applied on the gear 10a increases. In the gear 10b, it is preferable, in view of its shape, that the radius r1 is shorter than the radius r2.

The shape of the gear 10b is just like an inverted configuration of the gear 10a, and each of the gears 10 is asymmetrical with respect to all the lines passing through the rotation center 30. It is shown by CAD (computer aided design) that the gears 10 are engaged with each other. Preferably, the gears 10 are produced by numerically controlled (NC) machine tool such as NC laser cutting machine, NC electric discharge machine, NC machining center, NC milling machine, NC turning center, and NC composite cutting machine, based on NC data from CAD or CAD/CAM. Since the top curved line 12 and the bottom curved line 14 are substantially semicircular in shape, NC data can be easily prepared by CAD or CAD/CAM and gears 10 can be easily produced by the NC machine tool. For this reason, even when the tooth profiles of the gears 10 are formed by the NC machine tool, production cost and production steps of the gears 10 can be reduced.

Figure 5:
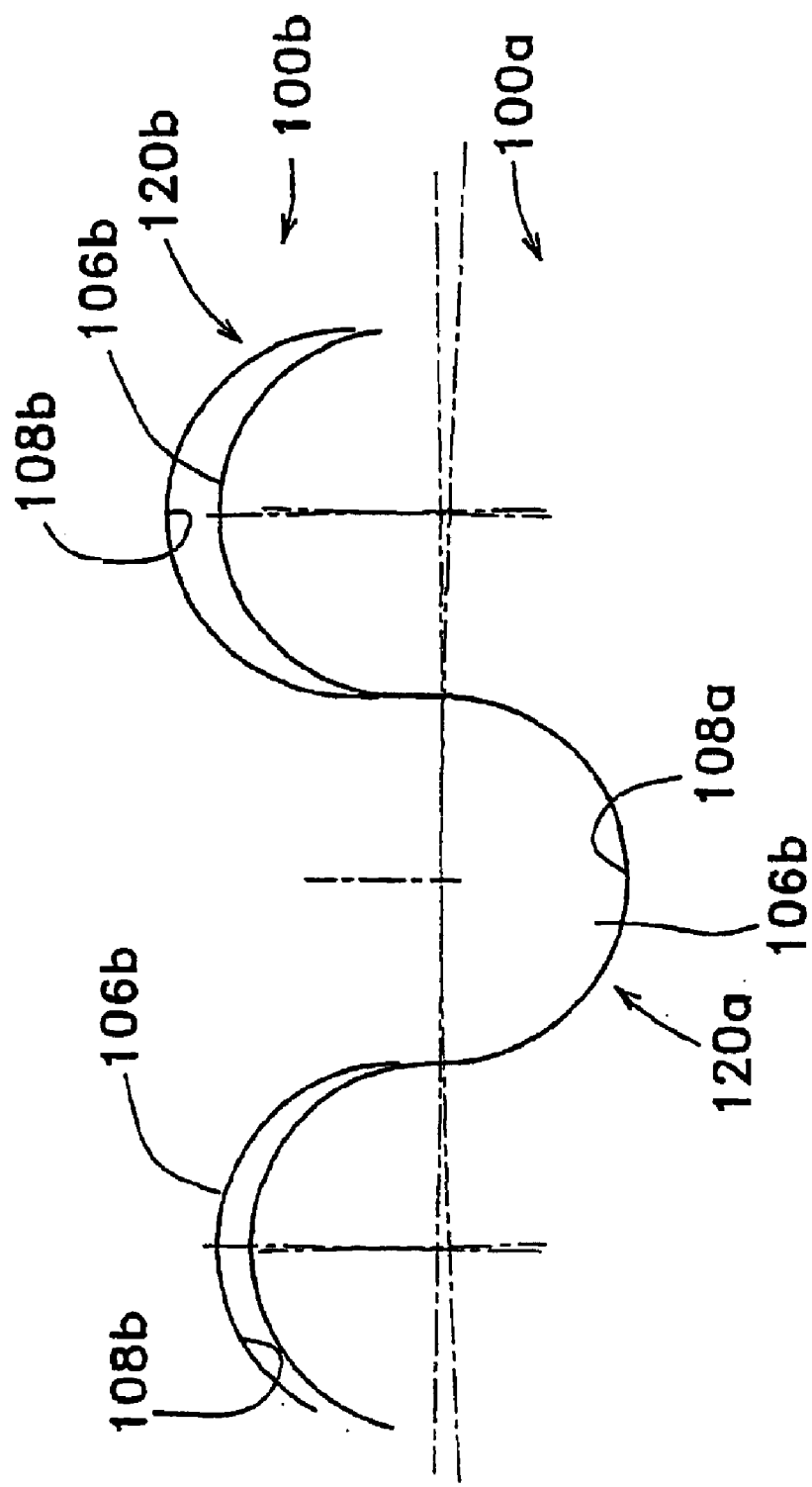
FIG. 5 is an enlarged front view of conventional gears.

Unlike gears 100 having a plurality of tooth profiles 120, each of which comprises a substantially semicircular top curved line 106 and a substantially semicircular bottom curved line 108, as shown in FIG. 5, clearances 40 are formed between the bottom curved line 18a of the gear 10a and the top curved line 16b of the gear 10b and between the bottom curved line 18b of the gear lab and the top curved line 16a of the gear 10a in the tooth profiles 20a and 20b having contact points of the two gears. Therefore, the gears 10a and 10b can be smoothly engaged with each other without being jammed or interfering, and thus durability is increased and noise level is reduced. Also, frictional resistance of the contact part is reduced, and thus mechanical efficiency and practicality can be increased. On the other hand, in the case of the gear 100, only a slight error in accuracy of finishing cause the jamming and interfering of the tooth profiles 120a and 120b.

Next, embodiments of a gear train 12 using the non-circular and asymmetrical gears 10 according to the present invention will be described. As shown in FIG. 3, the gear train 12 comprises a driving gear (second gear) 36, a gear 38 (third great) that meshes with the gear 36, a gear 10a bonded to the gear 38, and a gear 10b that meshes with the gear 10a. The gears 36 and 38 have a circular pitch line, but are different in size. The gears 36 and 38 are so produced that a point on the outer perimeter of the gear 38 which is in contact with a certain point on the outer perimeter of the gear 36 changes with time. For example, a point A on the outer perimeter of the gear 36 is in contact with a point B on the outer perimeter of the gear 38 at certain time. Then, after the gear 36 rotates one turn, the point A is in contact with not point B but point C on the outer perimeter of the gear 38. After the gear 36 rotates one more turn, the point A is in contact with not point B or point C but point E on the outer perimeter of the gear 38.

In such gear train 12, the odd gears 10a and 10b are rotated. Therefore, loads applied on the gears 36 and 38 in the direction of rotation of the rotation shafts 30 are not applied on the whole perimeters of the gears 36 and 38 but they are applied on local points of the perimeters. However, such local points are not always the same points of the perimeters of the gears 36 and 38, but they are distributed to all over the perimeters. For this reason, durability of the gears 36 and 38 can be increased. This gear train 12 produces higher effect when it is used in a barrel finishing machine on which heavy load is applied by the weight of workpieces, medium and abrasive water. In FIG. 3, the gear 38 is larger in size than the gear 36, and rotation speed is reduced when rotary motion is transmitted from the gear 36 to the gear 38.

Next, embodiments of a barrel finishing machine 14 using the gears 10 and 12 according to the present invention will be described. In this barrel finishing machine 14, the gear train 12 rotates a drum 44 in which workpieces 42 are contained. As shown in FIG. 4, the drum 44 is circular in cross section perpendicular to a rotation shaft 46 of the drum 44.

Figure 6:
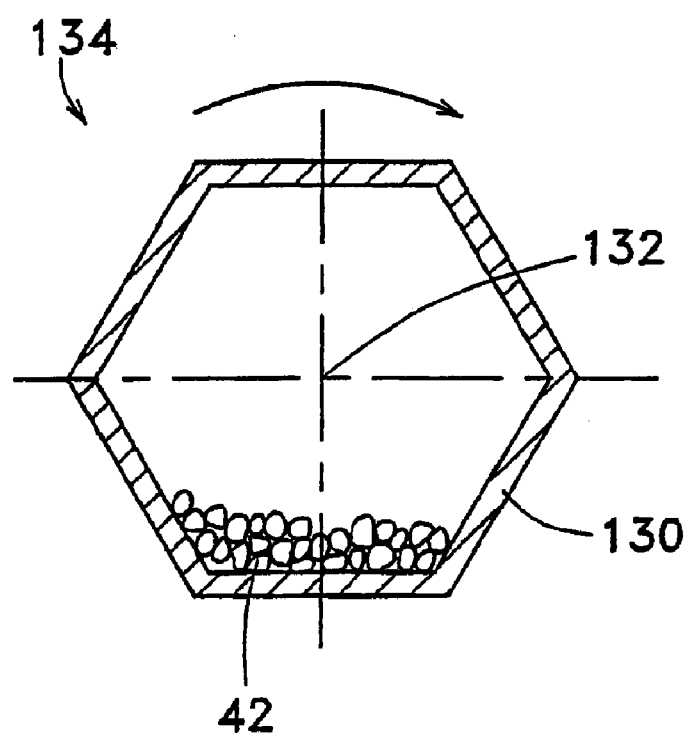
FIG. 6 is a front sectional view of a conventional barrel finishing machine.

Since the drum 44 in such barrel finishing machine 14 is circular in cross section perpendicular to the rotation shaft 46 thereof, the workpieces 42 do not flow but slide down the inner wall of the drum 44 smoothly to the bottom thereof. Therefore, since the workpieces 42 slide down while being mixed with medium and do not collide with each other, they do not become damaged and the quality of the workpieces 42 can be improved. Specifically, finishing effect can be improved, unlike a conventional barrel finishing machine 134 shown in FIG. 6, in which a drum 130 is hexagonal or polygonal in cross section perpendicular to a rotation shaft 132. Particularly, when a drum is rotated using the odd gears 10, the objects 42 are shaken off the drum by variations in rotational speed. Thus, the effect of the drum 44 which is circular in cross section perpendicular to the rotation shaft 46 is particularly brought to the fore, when the drum is rotated using the odd gears 10. In the barrel finishing machine 14, the drum 44 is tapered towards the ends thereof in the direction of rotation shaft 46, as shown in FIG. 4(b). Therefore, the workpieces 42 are slid down to the center portion of the drum 44 and thus uneven finishing can be prevented. The same effects can be produced when the drum 44 of the barrel finishing machine 14 is oval in cross section perpendicular to the rotation shaft 46 as shown in FIG. 7. The drum 44 can be of any curved or polygonal shape in cross section. Further, the side geometry of the drum 44 shown in FIG. 4(b) can be of any curved or polygonal shape.

Figure 8:
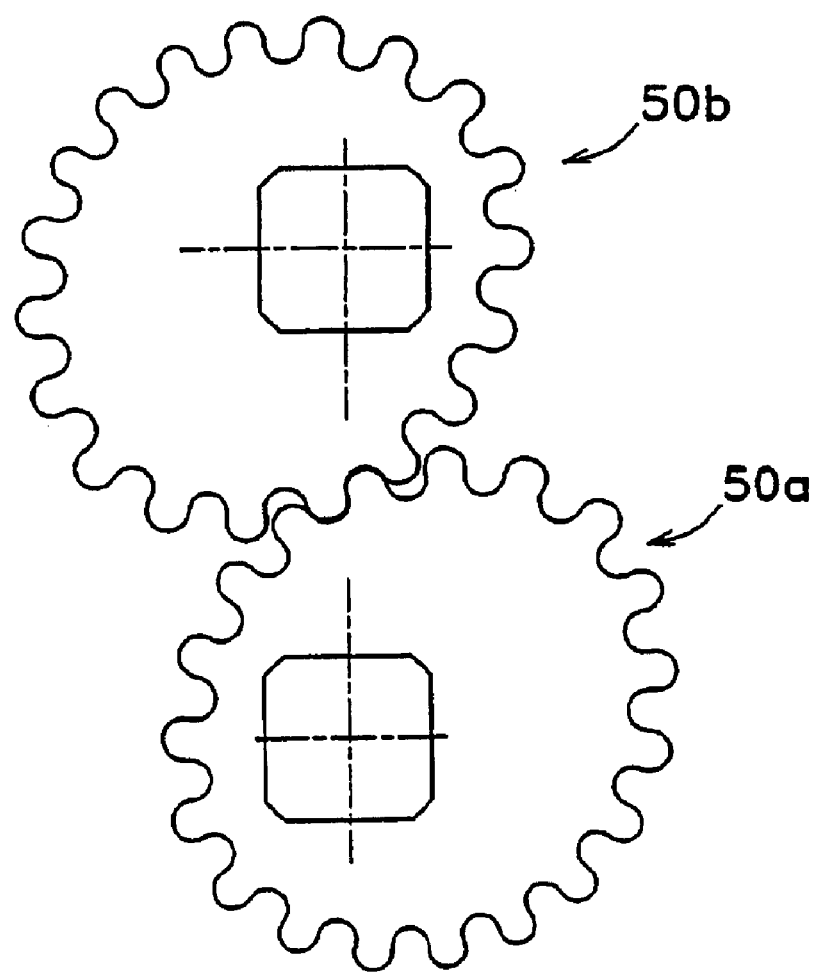
FIG. 8 is a front view of another embodiment of the non-circular and asymmetrical gears of the present invention.
Figure 9:
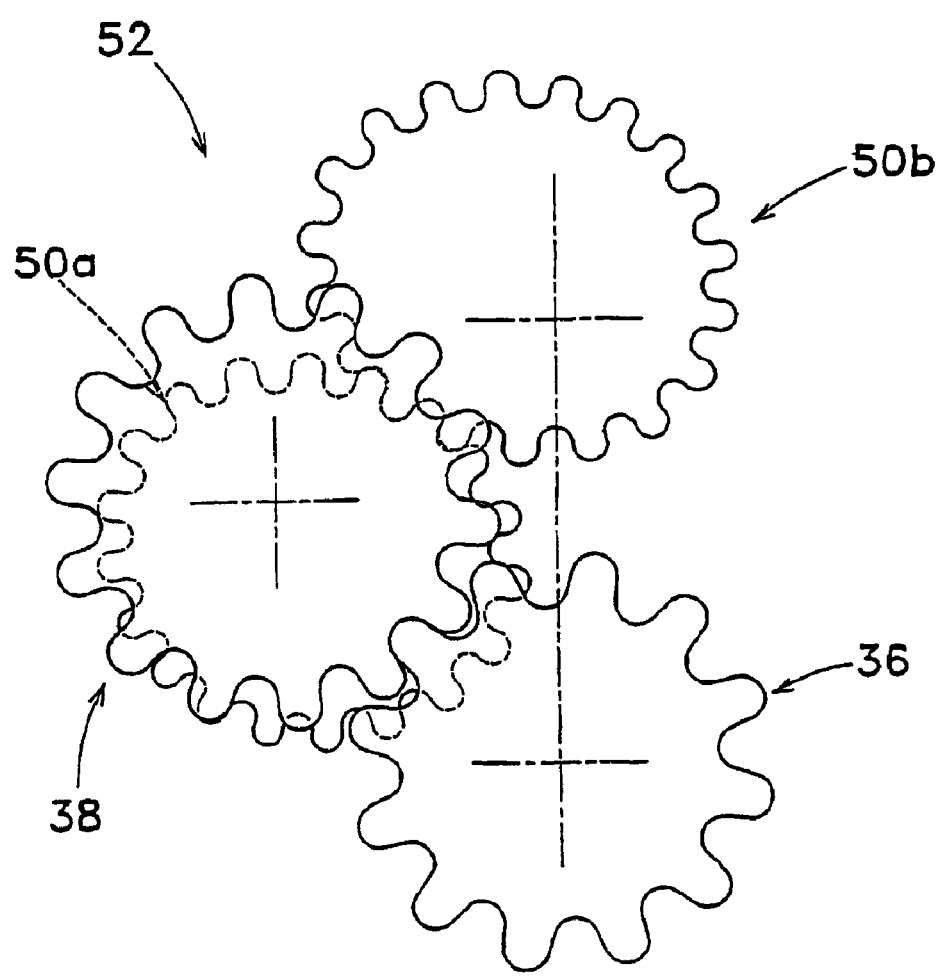
FIG. 9 is a front view of a gear train using the non-circular and asymmetrical gears shown in FIG. 8.

The non-circular and asymmetrical gears of the present invention may be gears 50 shown in FIG. 8 or a gear train 52 shown in FIG. 9. The gears 50 produce the same effects as the gears 10 do, but they are different in shape and size from the gears 10. The gear train 52 produces the same effects as the gear train 12 does, but it is different in shape and size from the gear train 12.

Figure 10:
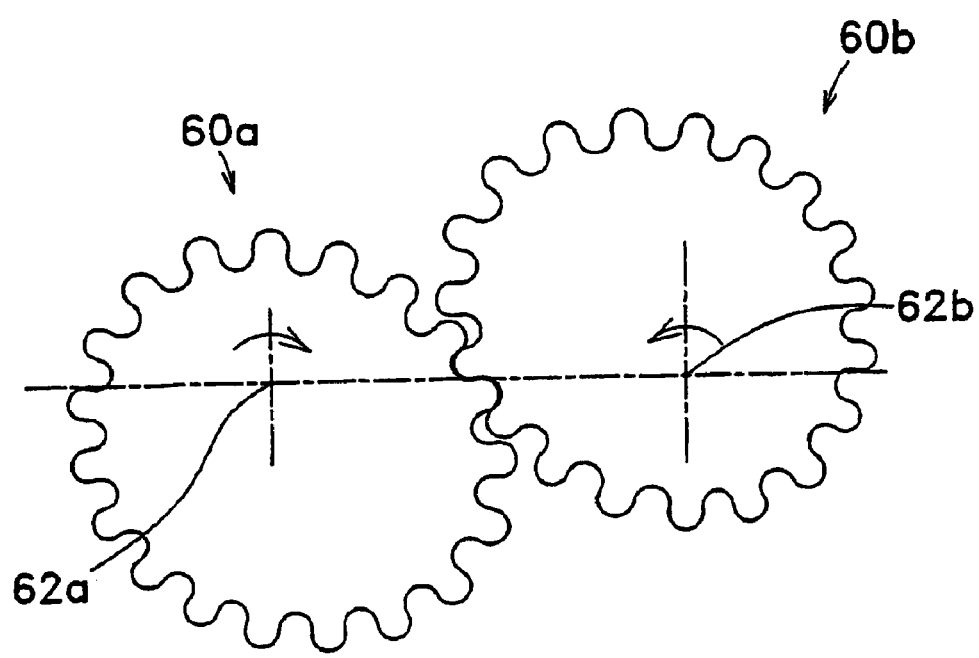
FIG. 10 is a front view of still another embodiment of the non-circular and asymmetrical gears of the present invention.
Figure 11:
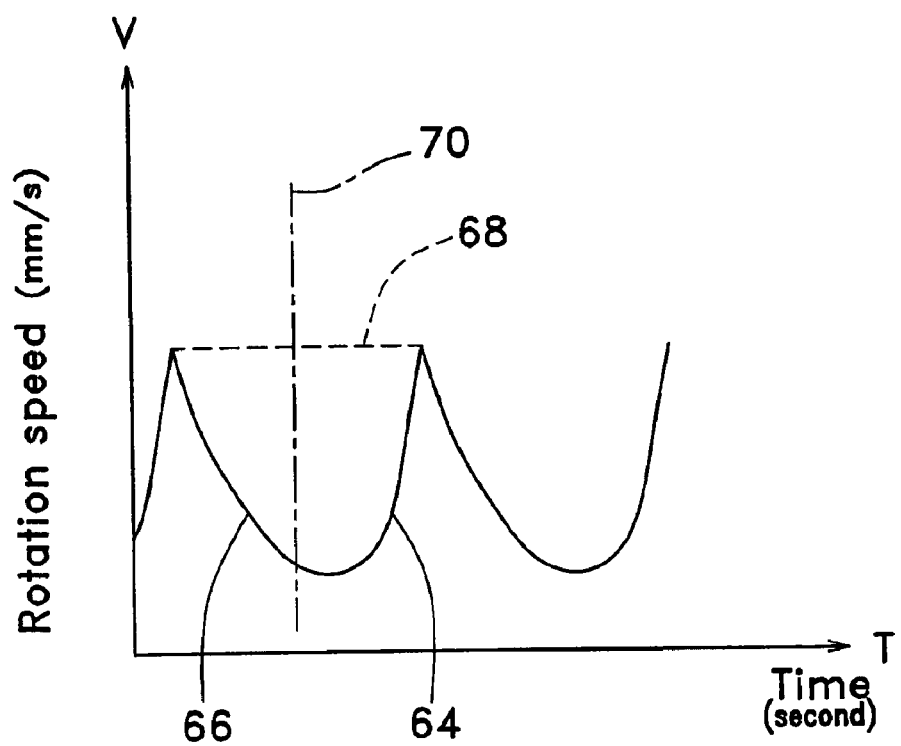
FIG. 11 is a graph showing a rotation speed of the non-circular and asymmetrical gear.

Further, the non-circular and asymmetrical gears of the present invention may be gears 60 shown in FIG. 10. In this specification and drawing, the gears 60 are composed of gears 60a and 60b. The gears 60 are also not circular gears but odd gears in which a pitch radius between the pitch line and a rotation center 62 is not constant, and each of which are asymmetrical with respect to all the lines passing through the rotation center 62. The relationship between the time T and a rotational speed V of the gear 60b when the gear 60a is rotated at a fixed speed is shown in FIG. 11 as a graph. The slope of the curved line segment 64 which shows the accelerations of the rotational speed is steeper than that of the curved line segment 66 which shows the reduction of the rotational speed. The curved line segments 64 and 66 are asymmetrical with respect to a perpendicular bisector 70 of a straight line 68 that connects peak points P of the rotational speed V.

Figure 12:
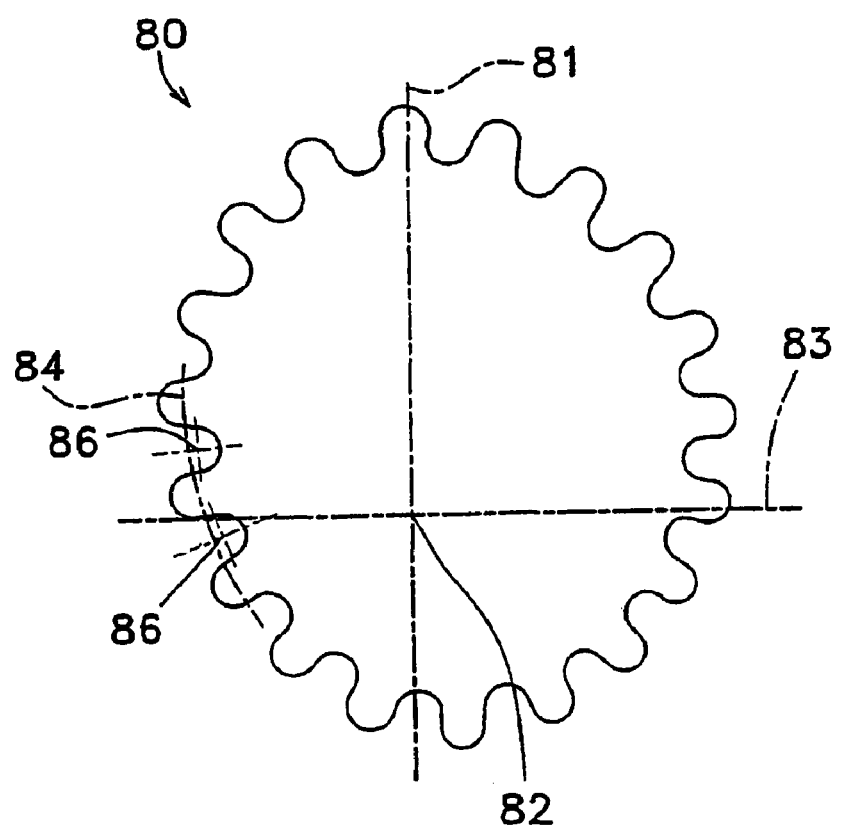
FIG. 12 is a front view showing a further embodiment of the non-circular and asymmetrical gears according to the present invention.

Further, the non-circular and asymmetrical gear of the present invention may be gear 80 shown in FIG. 12. The gear 80 is not a circular gear but an odd gear in which a pitch radius between a pitch line 84 and a rotation center 82 is not constant, and which is asymmetrical with respect to all the lines passing through the rotation center 82. For example, a center point 86 of a bottom curved line lies inside the pitch line 84. The gear 80 is asymmetrical with respect to lines 81 and 83 which pass through the rotation center 82. The tooth profile of the non-circular and asymmetrical gear of the present invention may be not only circular as shown in FIG. 2 but also non-circular (e.g. involute, cycloidal, or trochoid curve, or similar curve thereof). The tooth profile depends on performances of an industrial machine (machine tool such as pump, compressor, and barrel finishing machine, motor vehicle (car engine, wheelchair, automobile, or the like), domestic electrical equipment (washing machine or the like) in which the gears are used.

Figure 13:
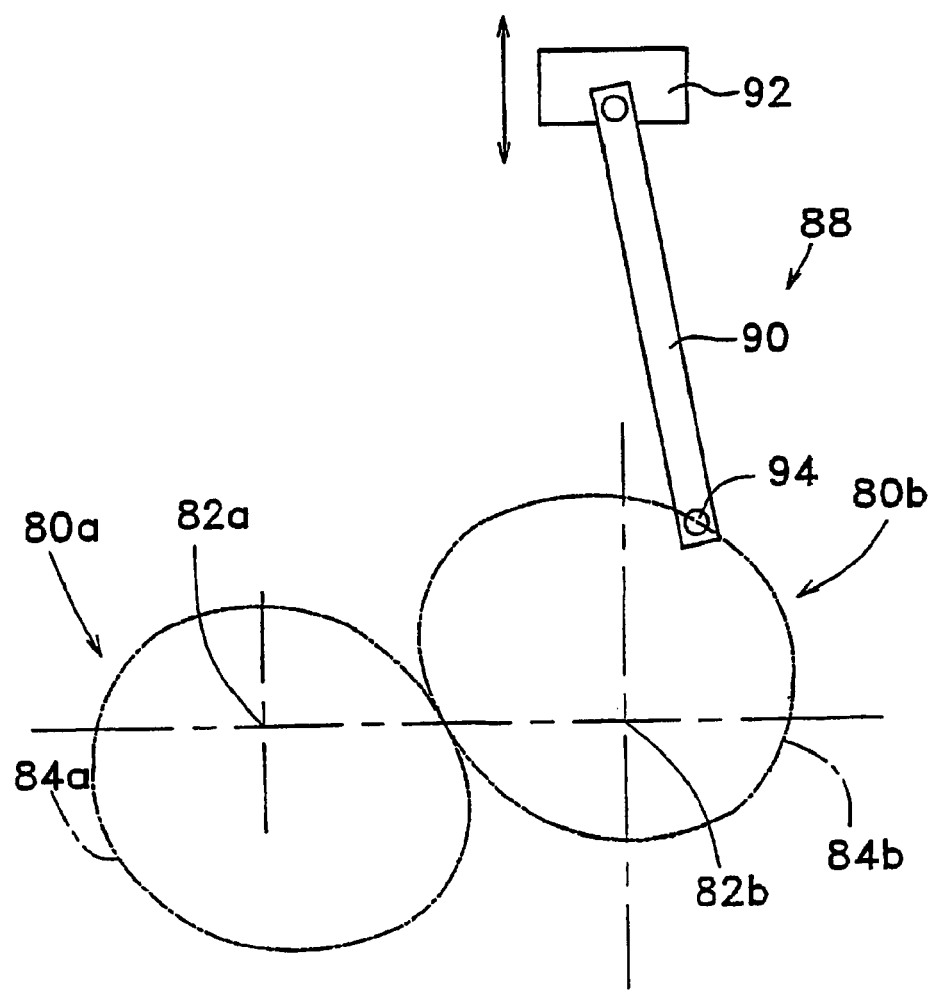
FIG. 13 is a front view showing a reciprocating mechanism using the non-circular and asymmetrical gears shown in FIG. 12.
Figure 14:
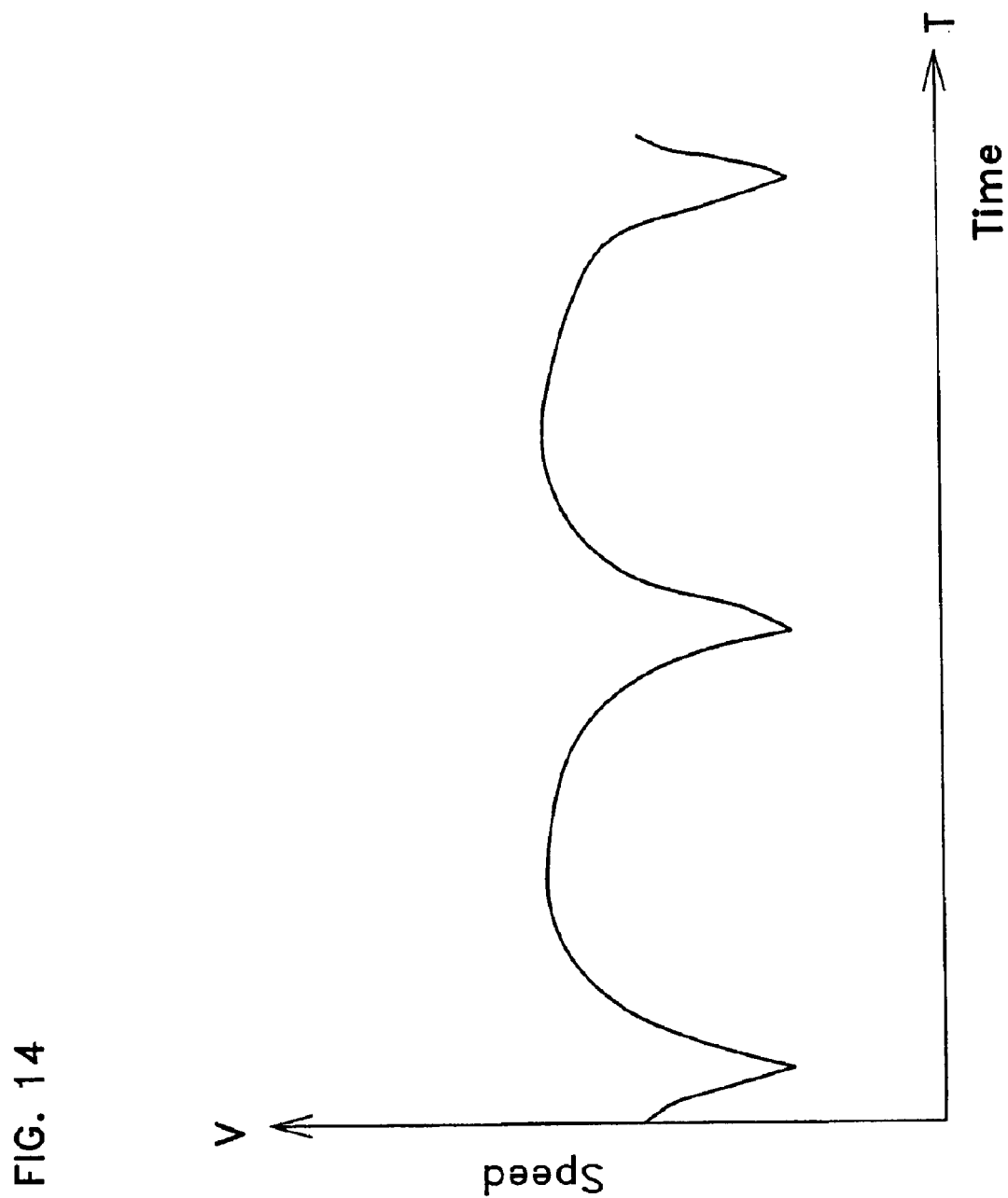
FIG. 14 is a line graph showing a piston displacement in the reciprocating mechanism shown in FIG. 13.
Figure 15:
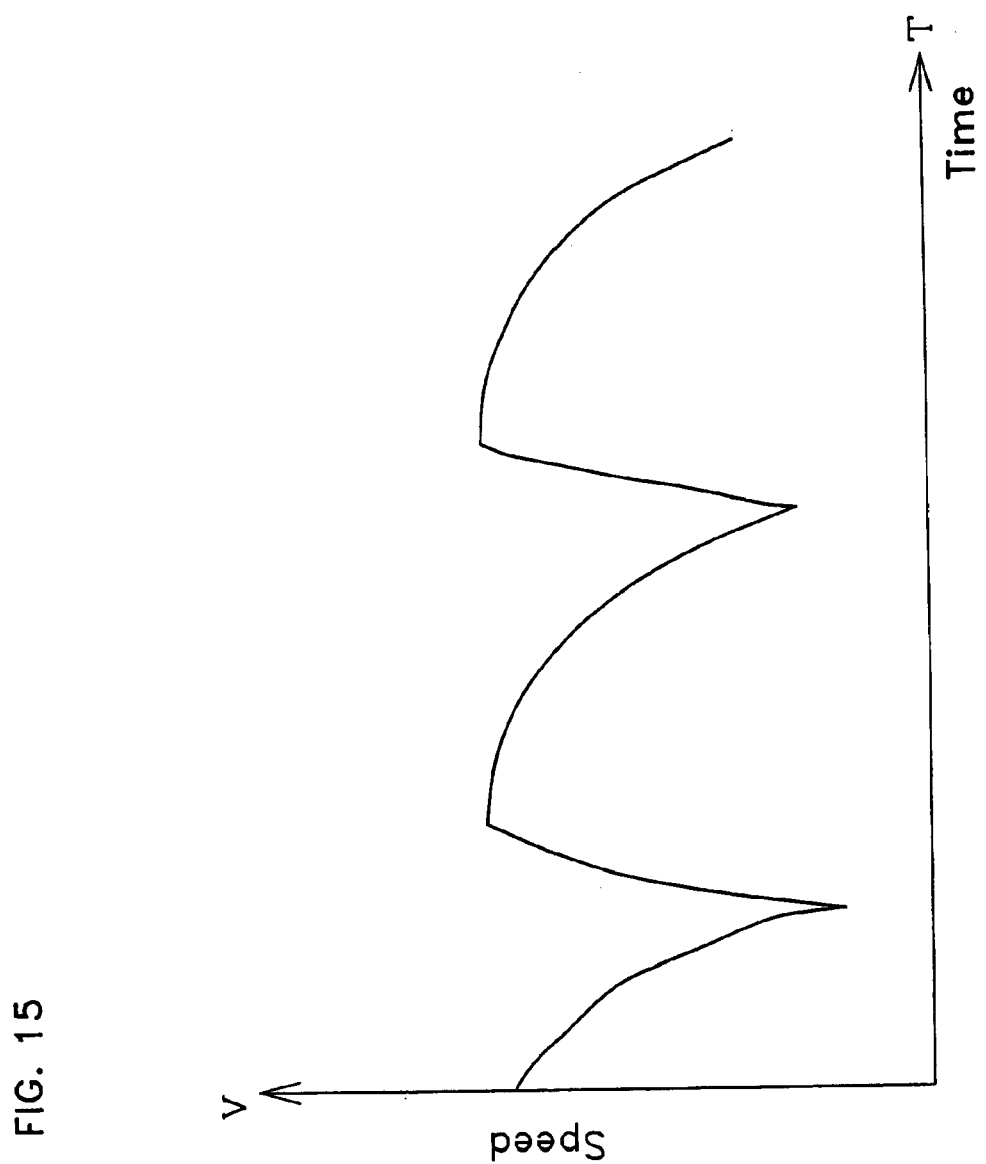
FIG. 15 is a line graph showing a piston displacement in a conventional reciprocating mechanism.

FIG. 13 shows a reciprocating mechanism 88 using the gears 80. This reciprocating mechanism 88 comprises a driving gear 80a, a driven gear 80b, a link 90 coupled to the gear 80b by pins 94, and a piston 92 that can reciprocate using the link 90. Since the gear 80b has a plurality of pin joints for rotatably setting the pins 92, the link 90 can be detachably coupled to a suitable pin joint of the gear 80b for improving performances of the mechanism. A curve for showing a displacement of speed in a reciprocating direction of the piston 92 of the reciprocating mechanism 88 is gently curved as shown in FIG. 14, unlike a steep curve for a conventional reciprocating mechanism as shown in FIG. 15. Thus, the piston 92 can reciprocate smoothly. Such reciprocating mechanism 88 is not limited to the piston mechanism, but can be applied to various motion mechanism such as a drive mechanism in a pump or car or can be used in an arm, drum, tool, compressor, press, air blower, crusher, mixer, washing machine, chain saw, mowing machine, car washer, kick starter, automatic machine, conveyor, apparatus for handicapped person (wheelchair, robot, and the like), wiper, or the like.

Figure 16:
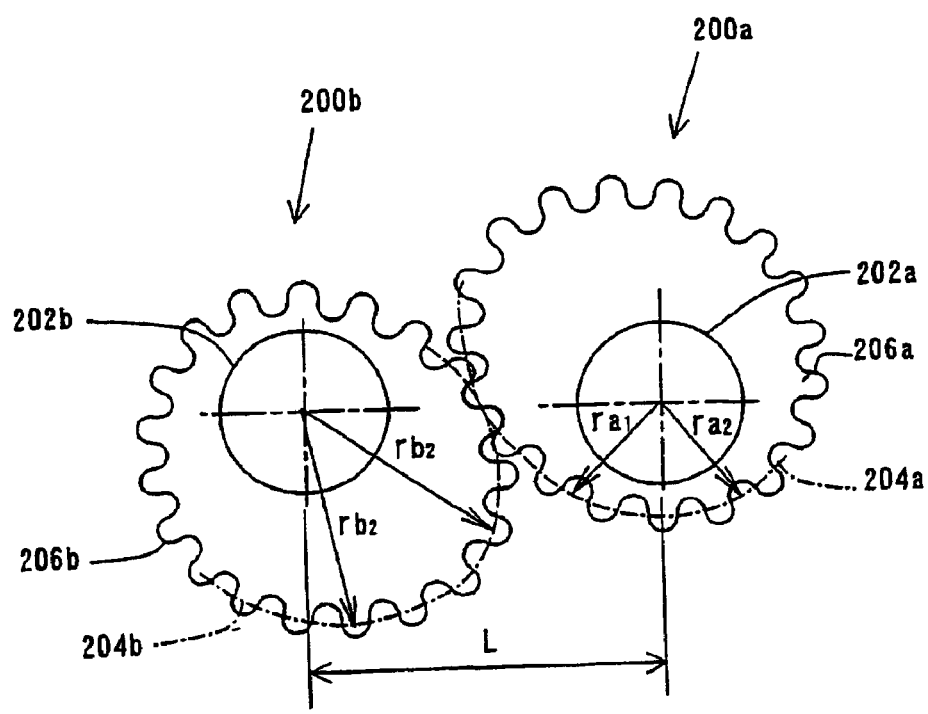
FIG. 16 shows asymmetrical gears of the present invention.

Further, the gears of the present invention may be asymmetrical gears 200 as shown in FIG. 16, for example. The gears 200 are used as a reciprocating drive mechanism in a press. The gears 220 are produced by: recognizing fluctuations in loads on rotation shafts 202 of the gears; determining pitch curves 204 in accordance with the fluctuations; correcting the pitch curves 204 so that the gears having the pitch curves 204 mesh with each other; determining tooth profiles 206 in accordance with the pitch curves 204; and machining gear materials to the determined tooth profiles 206.

A method of producing the asymmetrical gears 200 will be described in detail below.

First, fluctuations in loads on the rotation shafts 202 of the gears in a punch or die press operation are measured using a force or torque sensor or the like. For example, in a press operation using a tough material, the heaviest load is applied when a punch and die get close to each other to press the material. On the contrary, when the punch and die are moved away from each other, almost only mechanical load is applied. In this case, the rotational speed ratio S of the driven asymmetrical gear 200b to the driving asymmetrical gear 200a must be decreased as the punch and die come closer, whereas the rotational speed ratio S is increased as the punch and die move away from each other. This is because the rotational speed of the driven gear 200b must be decreased when heavier load is applied whereas the pressing operation must be expedited when lighter load is applied. During the one turn of the gears 200a and 200b, the heaviest load and the lightest load are applied to the rotation shaft once each. The fluctuations in rotational speed ratio S are determined from this viewpoint, and then the pitch curves 204a and 204b are calculated from the equation S=ra/rb (wherein "ra" represents a radius of a pitch curve of the asymmetrical gear 200a and "rb" represents a radius of a pitch curve of the asymmetrical gear 200b). The pitch curves 204a and 204b are of the same shape but are oriented in different directions.

Next, the pitch curves 204a and 204b are corrected so that they rotate in constant mesh. In other words, the CAD data of the pitch curves 204a and 204b are corrected so that the equation "ra+rb=L (constant)" holds good for one pair of tooth profiles of the gears 200a and 200b. Therefore, the shapes of the corrected pitch curves 204a and 204b are slightly different from ideal shapes. After thus determining the pitch curves 204a and 204b, a top curved line and a bottom curved line whose center points are substantially on the pitch curves 204a and 204b are drawn by CAD to determine tooth profiles 206a and 206b. The tooth profiles 206a and 206b are of the same shape, but are oriented in different directions.

Next, NC data is prepared from the tooth profiles 206a and 206b determined by CAD. Gear materials are machined on the basis of this NC data to produce the asymmetrical gears 200a and 200b. Since the tooth profiles of the gears 200a and 200b of the present invention are determined in accordance with fluctuations in loads, the resulting gears are asymmetrical in shape. These asymmetrical gear 200a and 200b may be used in a compressor. The teeth of the asymmetrical gears 200a and 200b may be involute teeth.

Figure 17:
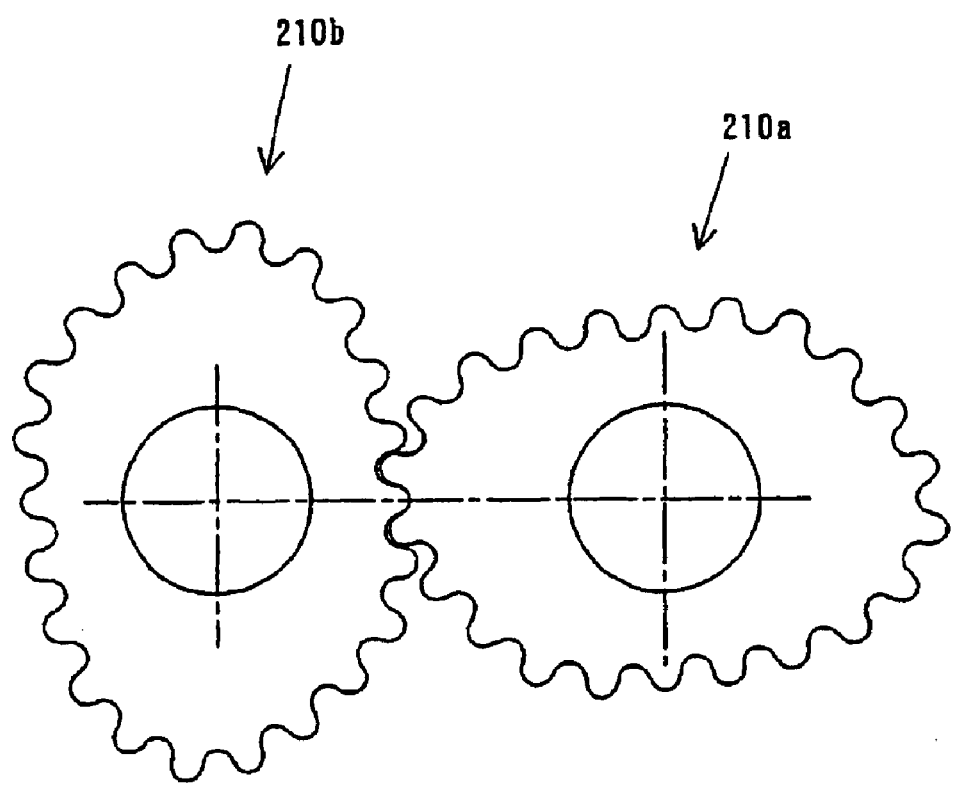
FIG. 17 shows another embodiment of the asymmetrical gears of the present invention.

Further, the gears of the present invention may be asymmetrical gears 210a and 210b shown in FIG. 17, for example. The asymmetrical gears 210a and 210b are used in a barrel finishing machine or mixer. During the one turn of the gears 210a and 210b, loads increase and decrease three times each. The asymmetrical gears 210a and 210b are produced by the same method as the gears 200a and 200b are produced. The teeth of the asymmetrical gears 210a and 210b may be involute teeth.

Figure 18:
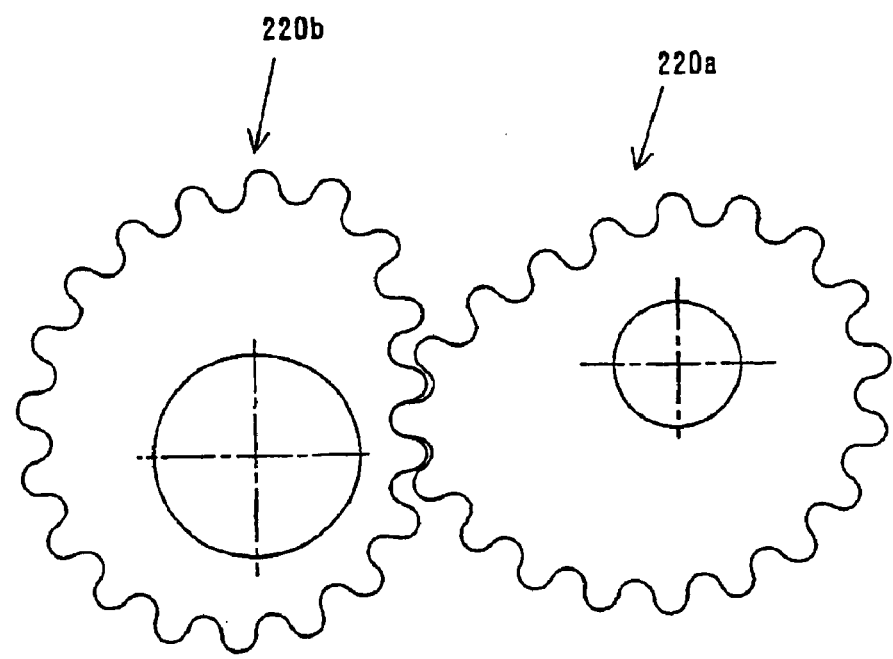
FIG. 18 shows still another embodiment of the asymmetrical gears of the present invention.

Further, the gears of the present invention may be asymmetrical gears 220a and 220b shown in FIG. 18, for example. The asymmetrical gears 220a and 220b are used in a rotary compressor for refrigerator or mixer. During the one turn of the gears 220a and 220b, loads increase and decrease three times each. The asymmetrical gears 220a and 220b are produced by the same method as the gears 200a and 200b are produced. The teeth of the asymmetrical gears 220a and 220b may be involute teeth.

Figure 19:
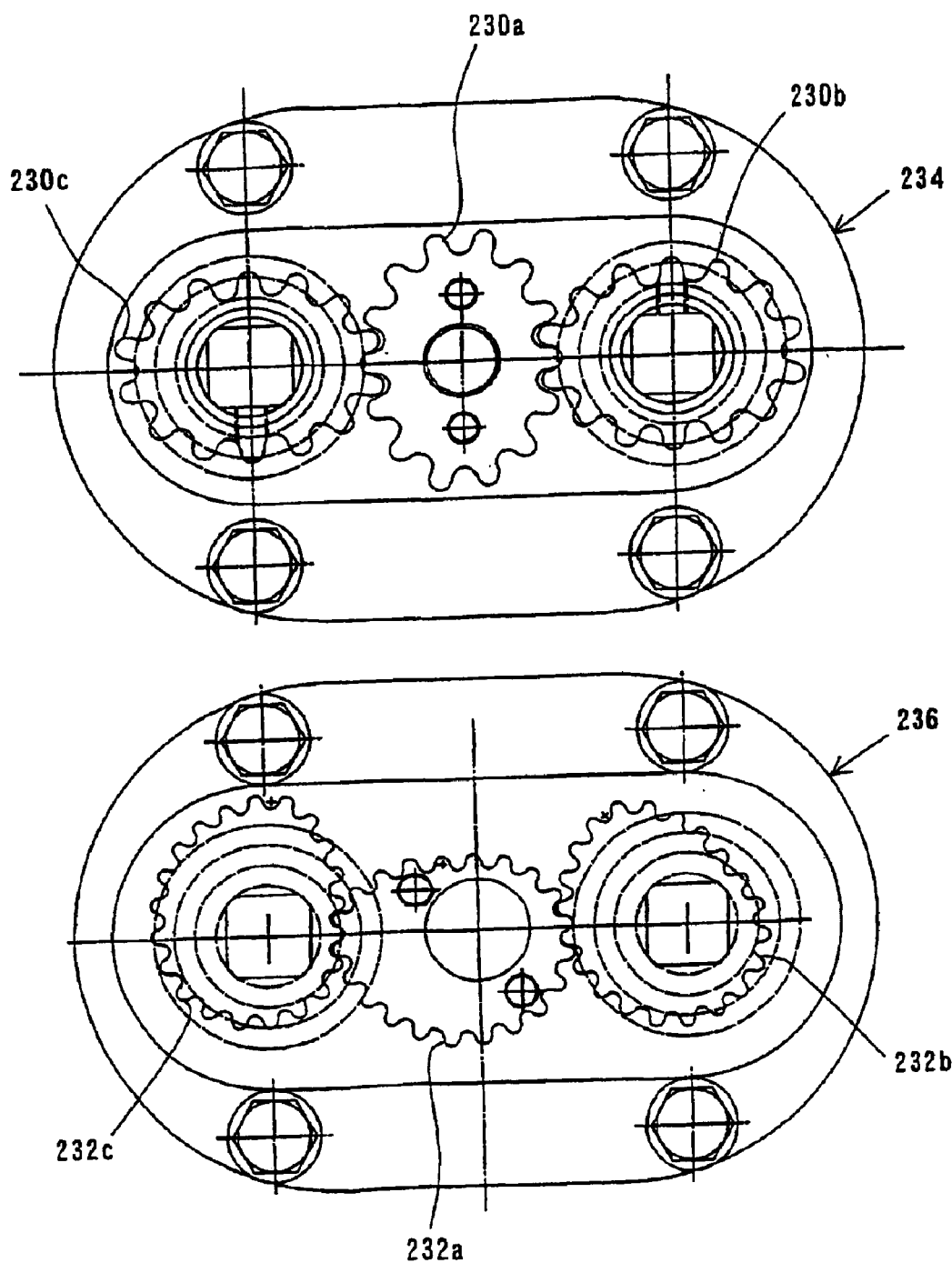
FIG. 19 shows a further embodiment of the asymmetrical gears of the present invention.

Further, the gears of the present invention may be asymmetrical gears 230a, 230b, and 230c, or gears 232a, 232b, and 232c shown in FIG. 19, for example. These gears are used in rotation transmitting portion 234 or 236 of a mixer. The asymmetrical gears 230a and 232a are driving gears, and the asymmetrical gears 230b, 230c, 232b, and 232c are driven gears. Since the diving gear is placed in the center and the driven gears are placed on both sides of the driving gear, vibrations can be prevented even when rotational speed is changed. Thus asymmetrical gears can be effectively used.

Figure 20:
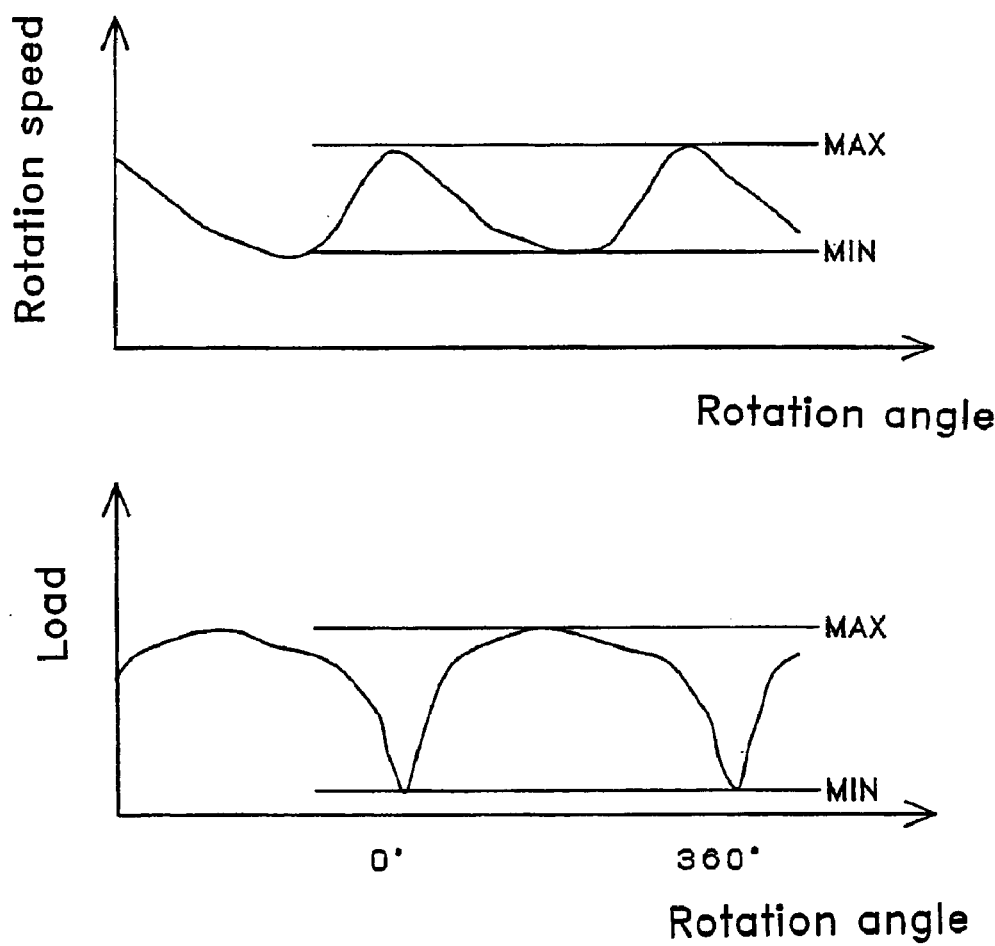
FIG. 20 is a graph showing a relationship among a rotation angle, rotation speed, and load of the asymmetrical gear of the present invention.

An example of a relationship between fluctuations in load on the rotation shaft (units: Newton (N), kgf, or the like) and rotational speed (units: rmp or the like) is shown in FIG. 20 in connection with determination of the tooth profiles of the gears of the present invention. The asymmetrical gears shown in FIG. 20 are used for driving a piston. During the one turn of the gears, loads increase and decrease once each. The rotational speed of the gear becomes maximum when the lightest load is applied, whereas it becomes minimum when the heaviest load is applied. The rotational speed decreases with increase in loads, whereas it increases with decrease in loads. Also, an increase rate of the loads is lower than a decrease rate of the rotational speed, whereas a decrease rate of the loads is lower that an increase rate of the rotational speed. To be more specific, the loads increase sharply at rotational angle of about 0 degree and then increase gently to a maximum (MAX), whereas the rotational speed decreases gently to a minimum (MIN). After that, the loads decrease gently at rotational angle of about 180 degrees and then decrease sharply to a minimum (MIN), whereas the rotational speed increases to a maximum (MAX) at substantially a constant rate. Thus, noise produced by the gears are prevented.

While the embodiments of the present invention have thus been described with reference to the drawings, it should be understood that the non-circular and asymmetrical gear, the gear train, and the barrel finishing machine of the present invention be not limited to the embodiments shown in the drawings, but can be materialized in other embodiments.

For example, the use of the non-circular and asymmetrical gears or the use of the gear train according to the present invention is not particularly limited, but the gears or the gear train of the present invention may be used in a reciprocating piston, washing machine, mixer, or windshield wiper, or the like. When the gears and gear train of the present invention are used in a washing machine or mixing machine (mixer, barrel finishing machine, or the like), plenty of foam is formed by turning a rotor (rotor blade or the like) at variable speeds, so that washing efficiency or mixing efficiency can be considered to be improved. Alternatively, where the gears and gear train of the present invention are used for a car's windshield wiper as an example of a link mechanism, the gears rotate at high speed only when the wiper wipes the middle section of the windshield, so that the windshield-wiper effect and visibility (ensure of and improvement in driver's view) are improved and the wearing away of the wiper can be reduced.

Alternatively, the gears or gear train of the present invention may be used for a motor of a compressor, using the capability of reciprocating at variable speeds. It is considered that the compressing efficiency can be improved by changing the reciprocating speed in accordance with load for compression. The compressing efficiency can be further improved by using the same additional motor in the compressor. Alternatively, where the gears or gear train of the present invention is used in a barrel finishing machine whose drum is tapered toward one end or both ends thereof in the direction of the rotation shaft or toward the center of the drum in the direction of rotation shaft, the side shape of the drum is not limited to the shape shown in FIG. 4(b), but it may be oval, circular, or spherelike shape which is tapered towards both ends in the direction of the rotation shaft. Alternatively, it may be of a trapezoidal or an odd oval shape which is asymmetrical with respect to a vertical line and which is tapered toward one end in the direction of the rotation shaft. Alternatively, it may be like a hourglass which is tapered towards the center in the direction of rotation shaft.

Various improvements, changes, and modifications can be made to the embodiments on the basis of knowledge of those skilled in the art without departing from the scope of the present invention.

INDUSTRIAL APPLICABILITY

In the production of the asymmetrical gears of the present invention, pitch curve is determined in accordance with fluctuations in loads on the rotation shafts of the gears, so that the pitch curve becomes asymmetrical. Although the fluctuations in loads generally depend on the use of the gears, the gears of the present invention can be produced in accordance with fluctuations in loads and therefore suitable gears can be produced in accordance with the use thereof. Further, although the rotational speed of a driven gear fluctuates in the case of conventional non-circular gears, an increase rate and a decrease rate of the rotational speed of the driven gear can fluctuate in the case of the non-circular and asymmetrical gears. Therefore, the non-circular and asymmetrical gears of the present invention produce better effects than conventional non-circular gears. For example, the gears of the present invention can absorb vibration. If the gears are so produced that an increase rate and a decrease rate of the rotational speed fluctuate, the gears become asymmetrical as a necessary consequence.

In such asymmetrical gears, power consumption can be reduced by correcting fluctuations in loads. It has been proved in an actual experiment that power consumption could be reduced by 25% to 27%.

When the asymmetrical gears of the present invention are used in a pump, the following effects are produced. When the asymmetrical gears of the present invention are used in a roots pump, pump efficiency can be improved and vibration can be absorbed. When they are used in a rotary pump, power consumption can be reduced and pump efficiency can be improved. When they are used in a piston pump, power consumption can be reduced.

When the asymmetrical gears of the present invention are used in a mixing machine or grinding machine, the following effects are produced. When they are used in a mixing machine, mixed density and mixing speed can be increased. When they are used in a home mixer, the same effects can be produced. When they are used in a washing machine so as to rotate fins at variable speeds, plenty of bubbles are formed. When they are used in a rotating barrel finishing machine, the barrel finishing machine has several times as much finishing power as a conventional barrel finishing machine.

When the asymmetrical gears are used as a driving means for a conveyor, the following effects can be produced. When they are used in a powder supply system to convey powders at variable speeds, powders can be divided into specific quantities. When they are used in a production line conveyor, the conveyor can be used as a low-cost intermittent conveyor.

When the asymmetrical gears of the present invention are used in a ram drive of a pressing machine, the following effects can be produced. When they are used in a link motion, a lowering speed of the ram can be varied in an analog fashion, the material can be extended easily by pressure, and the durability of a mold can be increased.

When the asymmetrical gears of the present invention are used for an output shaft of a compact engine, power consumption can be reduced. Further, since the gears can absorb the vibration, noise can be prevented when the gears are used in a large marine engine, and Raynaud's disease can be prevented when they are used in an engine chain saw.

When the asymmetrical gears of the present invention are used in a water meter, micromeasurement becomes possible by increasing the amount of flow using a variable speed motion.

In the non-circular and asymmetrical gears of the present invention, clearances are formed between the bottom curved line of the one gear and the top curved line of the other gear and between the bottom curved line of the other gear and the top curved line of the one gear in the tooth profiles having contact points of the two gears. For this reason, there is no need to produce the gears with an accuracy close to 0. The gears can mesh smoothly without being jammed or interfering with each other, so that the durability of the gears are increased and noise is reduced. In light of the fact that it is impossible to produce the gears with an accuracy of 0 and that the gears of the present invention can mesh smoothly with each other even though they are not produced with an accuracy close to 0, the gears of the present invention can produce effective effects. Further, since there is no need to produce the gears with an accuracy close to 0, the gears cap be produced easily.

The non-circular and asymmetrical gear and the gear train according to the present invention are characterized in that the gears have a plurality of tooth profiles, each of which comprises a substantially semicircular top curved line and a substantially semicircular bottom curved line, that a pitch radius between a pitch line and a rotation center is not constant, and that a radius of the substantially semicircular top curved line is not constant. For example, by making a radius of a top curved line of a tooth profile neighboring a first point on the pitch line which makes a pitch radius maximum longer than that of a top curved line of a tooth profile neighboring a second point on the pitch line which makes a pitch radius minimum, a speed increasing ratio of rotation becomes the highest when the gears come in contact with each other in the neighborhood of the first point, which cope with the biggest load applied in the neighborhood of the first point. Thus, the durability of the gears is increased and the lives of the gears are extended, and therefore thinner gears can be produced.

The gear train according to the present invention is characterized by comprising: a first gear in which a pitch radius between a pitch line and a rotation center is not constant; a second gear that mesh with the first gear; and a third gear that mesh with the second gear, in which a pitch line of the second gear is different in length from that of the third gear. In such gear train, a load is not always applied to the same local point on the perimeter of the gear, but the point on which a load is applied is shifted to various part of the perimeters. For this reason, durability of the gears can be increased, and thinner gears can be produced.

Further, where asymmetrical gears having a hexagonal barrel and having a speed ratio of 1:2 are used in the barrel finishing machine in which a drum containing workpieces and abrasives is rotated at variable speeds by the gear train, the workpieces and abrasives move in an ellipse arch, so that a trajectory length and a peripheral speed of the workpieces and abrasives are longer and faster than those of conventional barrel finishing machine. In fact, the abrasive efficiency increases by 40%. Further, various workpieces can be finished by the barrel finishing machine of the present invention because peripheral speeds thereof are variable.

In the barrel finishing machine characterized in that the drum is substantially circular or substantially oval in cross section perpendicular to a rotation shaft thereof according to the present invention, workpieces do not flow but slide down the inner wall of the drum smoothly to the bottom thereof. Therefore, since the workpieces slide down while being mixed with medium and do not collide with each other, they do not become damaged and the quality of the workpieces can be improved.

In the barrel finishing machine characterized by comprising a partition plate or torsion spring in the drum according to the present invention, different kinds of workpieces and abrasive materials can be used. Therefore, selection test for abrasive materials can be easily conducted, and therefore different kinds of workpieces can be finished by different abrasive materials.

In the barrel finishing machine characterized in that the drum is tapered toward one end or both ends thereof in the direction of the rotation shaft or toward the center of the drum in the direction of rotation shaft according to the present invention, the workpieces are slid down to the center portion of the drum and thus uneven finishing and the like can be prevented.

What is claimed is:

1. A method of producing asymmetrical gears comprising the steps of:
    recognizing fluctuations in loads on rotation shafts of the gears:
    determining pitch curves in accordance with the fluctuations;
    correcting the pitch curves so that the gears having the determined pitch curves mesh with each other;
    determining tooth profiles in accordance with the corrected pitch curves; and
    machining gear materials to the determined tooth profiles.

2. The method of producing asymmetrical gears according to claim 1, wherein said step of determining pitch curves comprises the substeps of:
    determining fluctuations in rotational speeds in accordance with the fluctuations in loads; and
    determining fluctuations in radii of the pitch curves in accordance with the fluctuations in rotational speeds.

3. The method of producing asymmetrical gears according to claim 2, wherein said substep of determining fluctuations in rotational speed is determining fluctuations in rotational speeds in such a manner that the rotational speeds decrease with increase of the loads and that the rotational speeds increase with decrease of the loads.

4. The method of producing asymmetrical gears according to claim 3, wherein said substep of determining fluctuations in rotational speeds is determining fluctuations in rotational speeds in such a manner that rates at which the rotational speeds decrease with Increase of the loads are different from rates at which the rotational speeds increase with decrease with the loads.

5. The method of producing asymmetrical gears according to any one of claims 1 to 4, wherein said step of machining gear materials comprises the substep of:
    preparing NC (numerically controlled) data of the determined tooth profiles; and
    machining the gear materials in accordance with the NC data.

* * * * *